June 26, 1962
H. J. MUMMA
3,040,865
MACHINE FOR HANDLING EGGS
Original Filed June 1, 1953
13 Sheets-Sheet 1
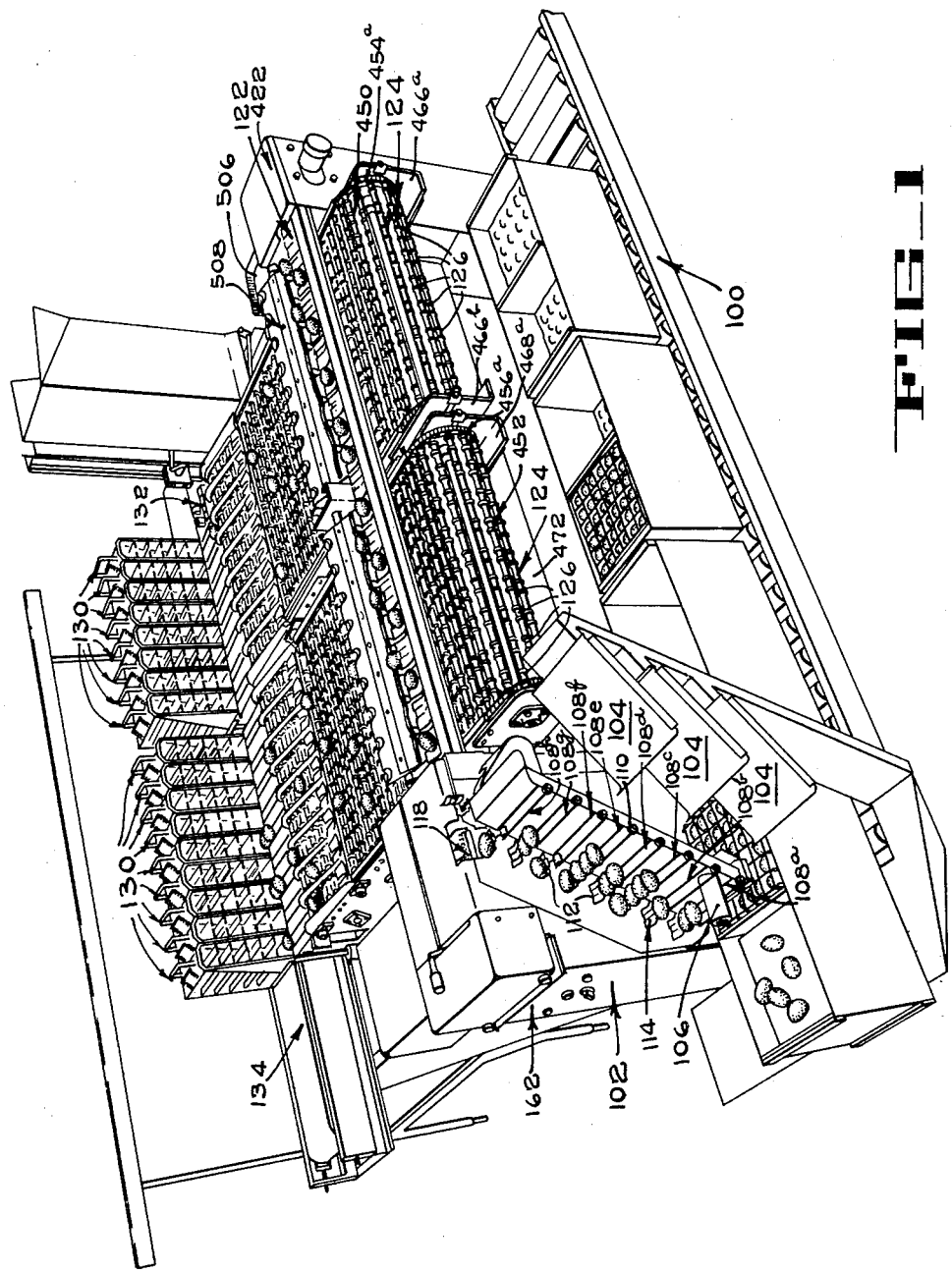
FIG_1
INVENTOR
HAROLD J. MUMMA
BY *Hans G. Hoffmeister*
ATTORNEY June 26, 1962     H. J. MUMMA     3,040,865
MACHINE FOR HANDLING EGGS
Original Filed June 1, 1953     13 Sheets-Sheet 2
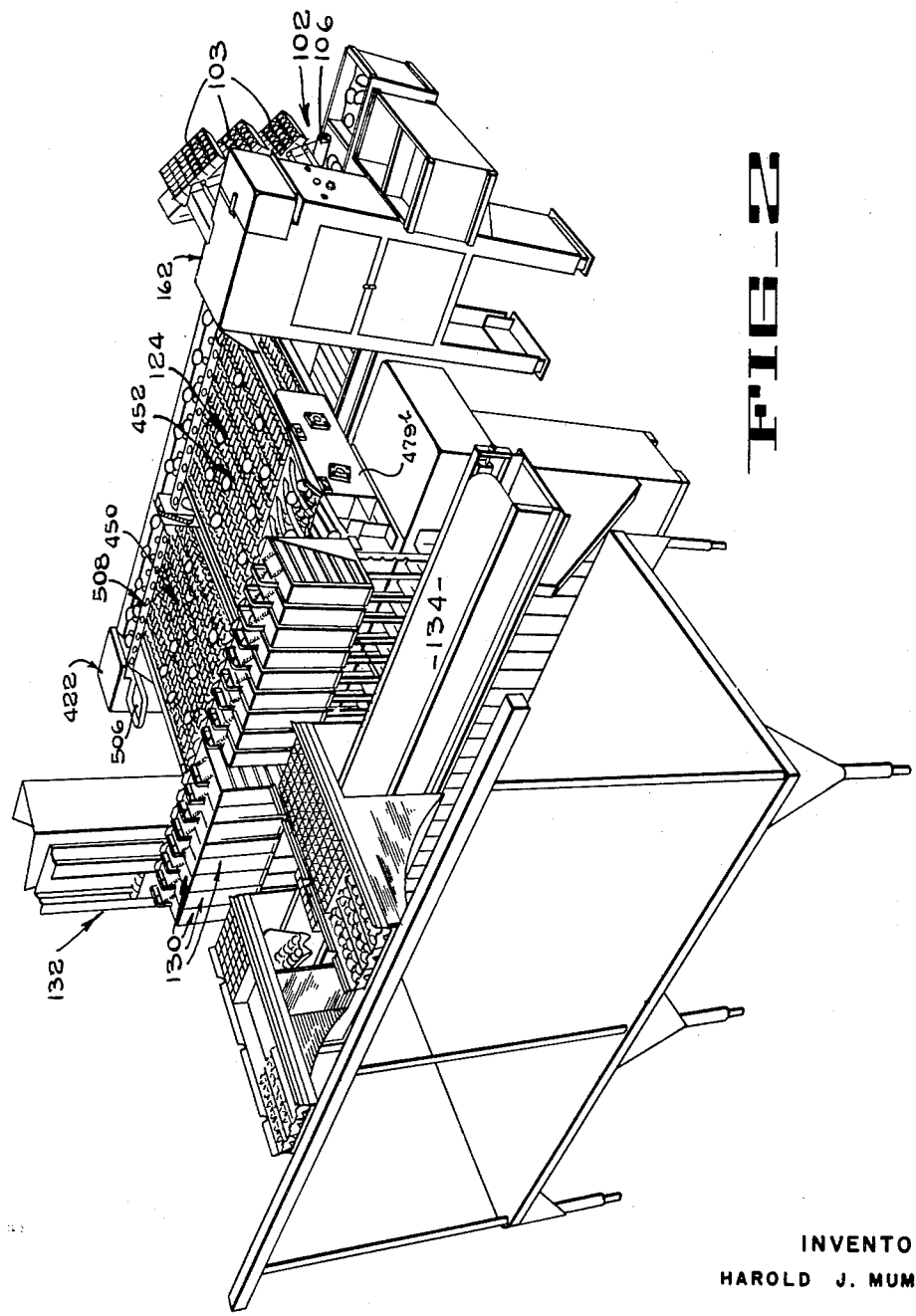
FIG_2
INVENTOR
HAROLD J. MUMMA
BY *Hans G. Hoffmeister*
ATTORNEY

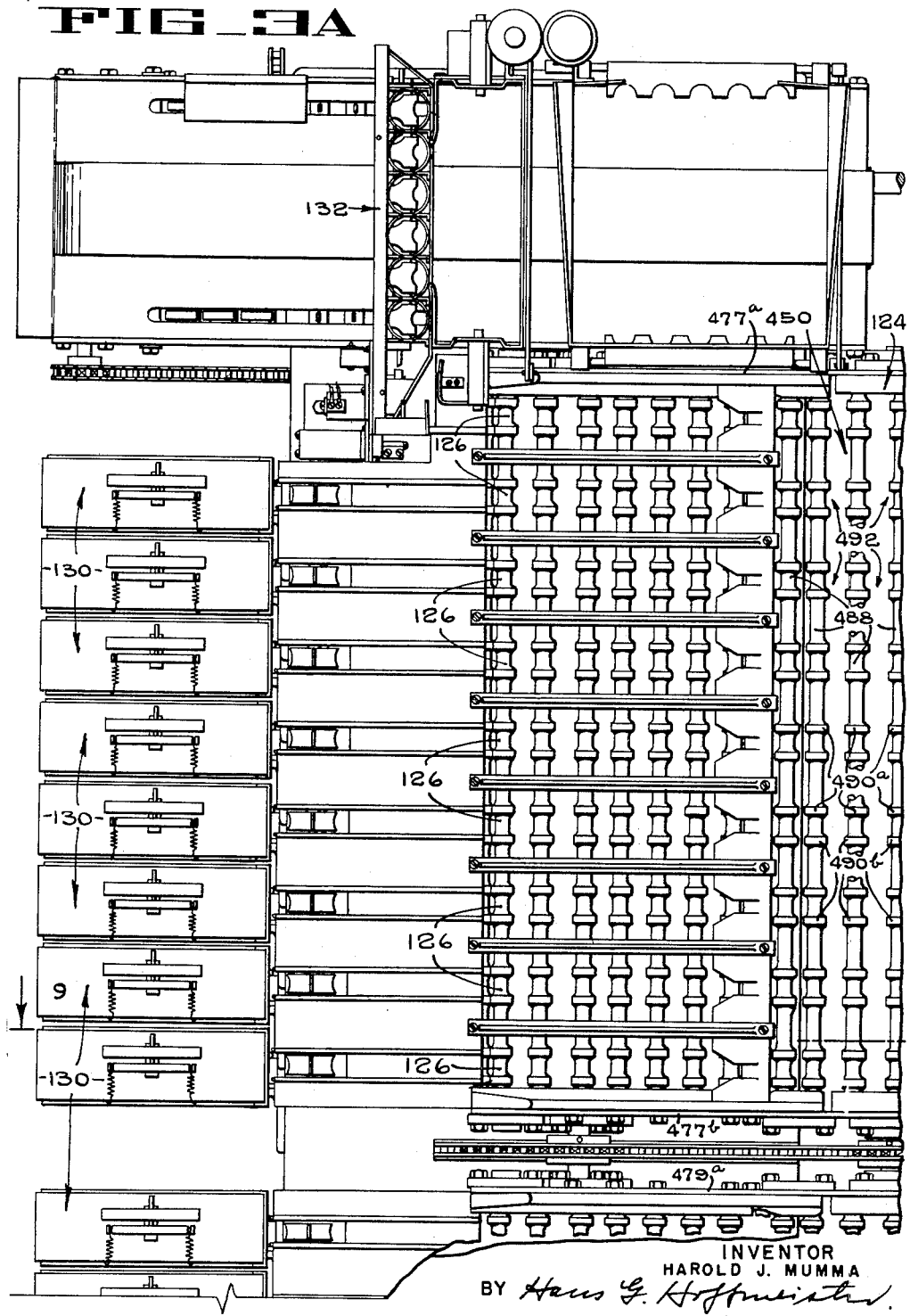

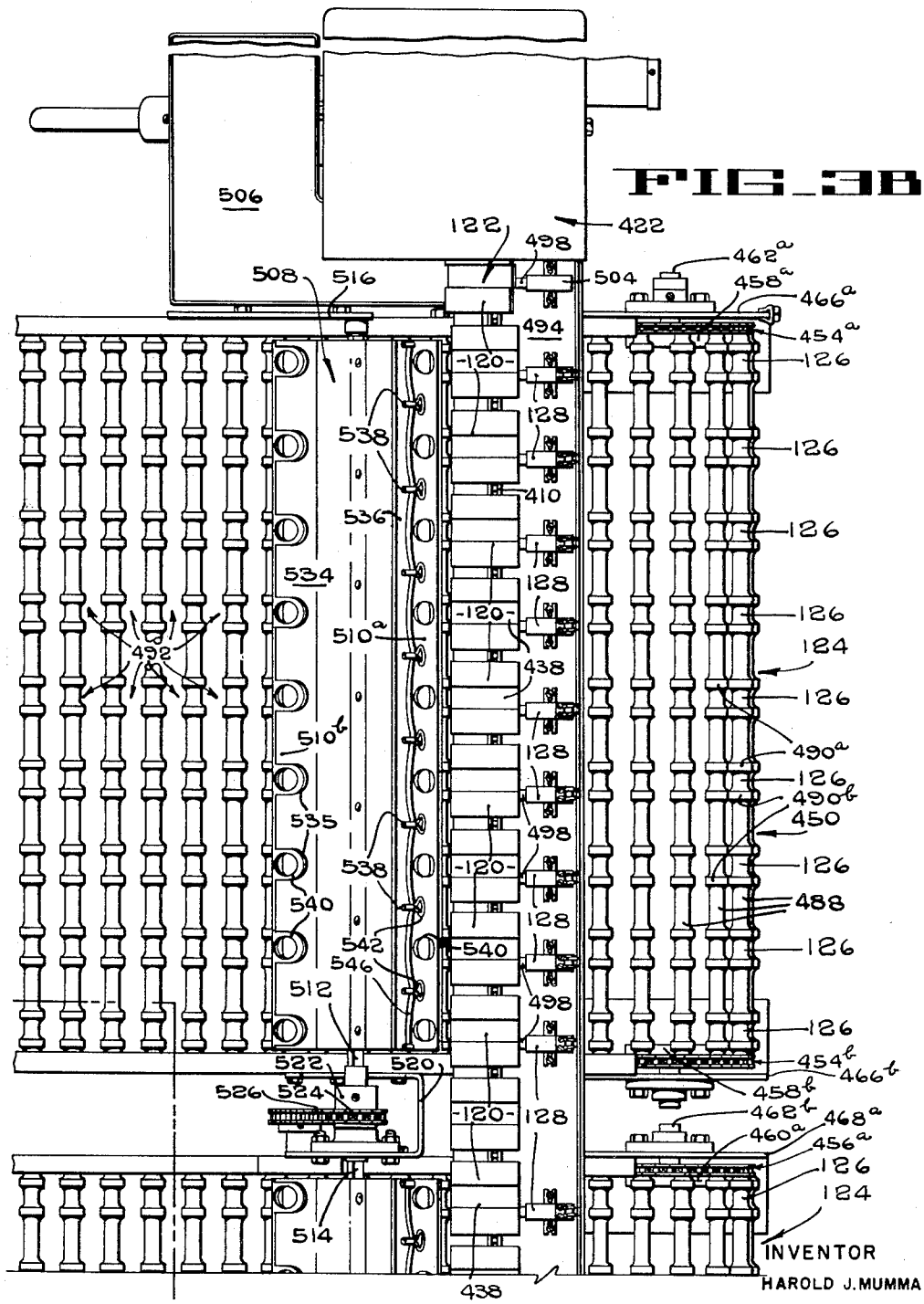

June 26, 1962  H. J. MUMMA  3,040,865
MACHINE FOR HANDLING EGGS
Original Filed June 1, 1953   13 Sheets-Sheet 5
FIG_3C
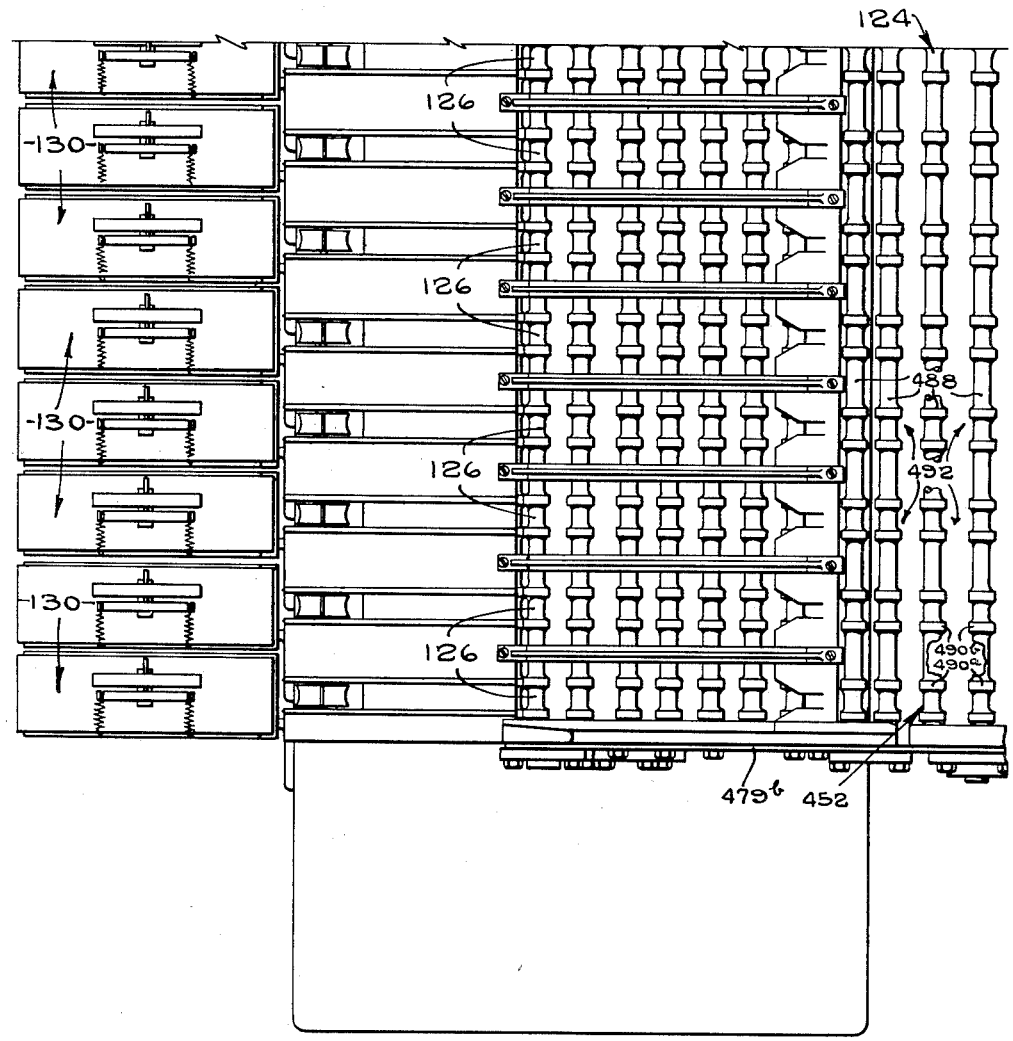
INVENTOR
HAROLD J. MUMMA
BY *Hans G. Hoffmeister*
ATTORNEY

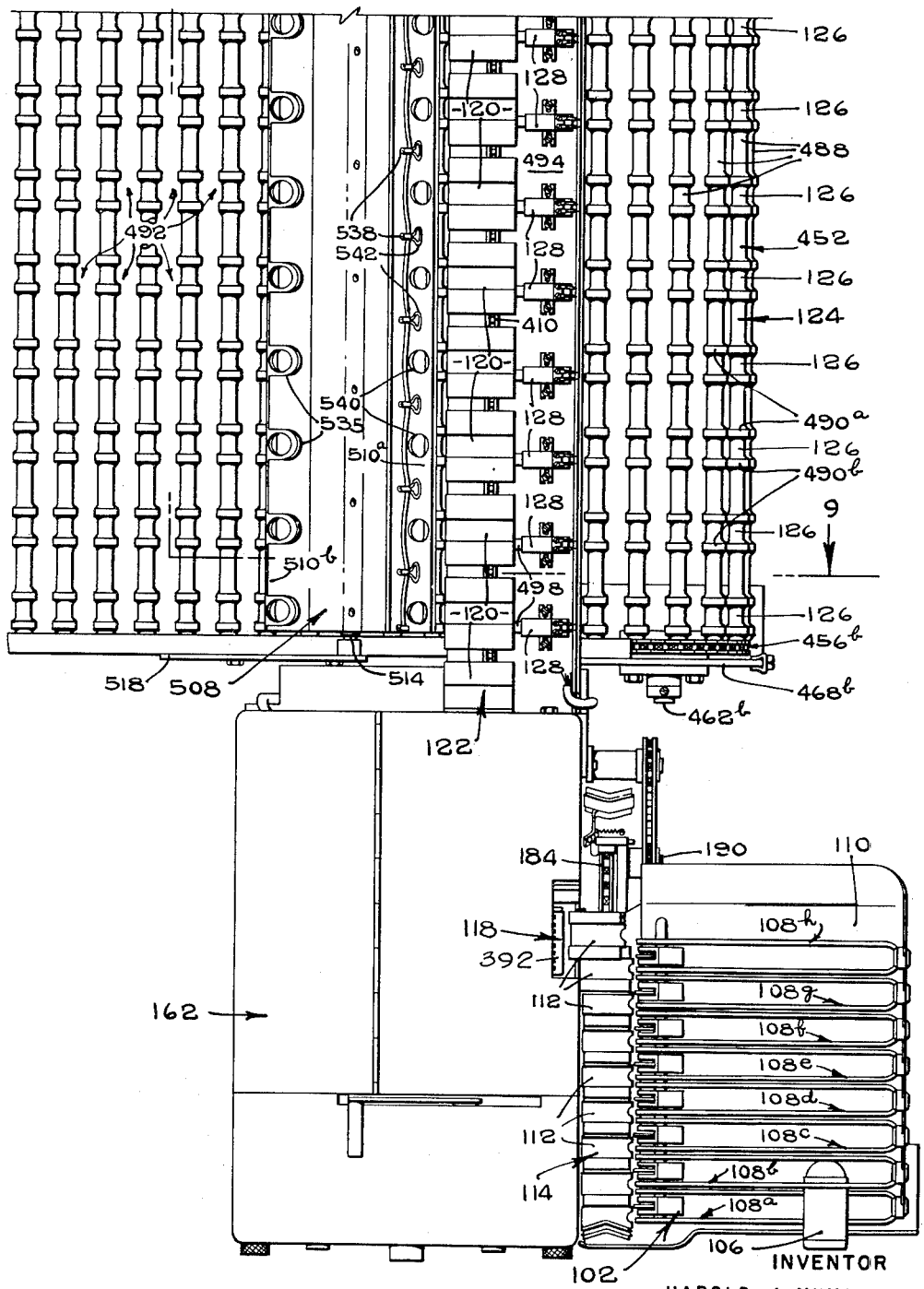
FIG_3D

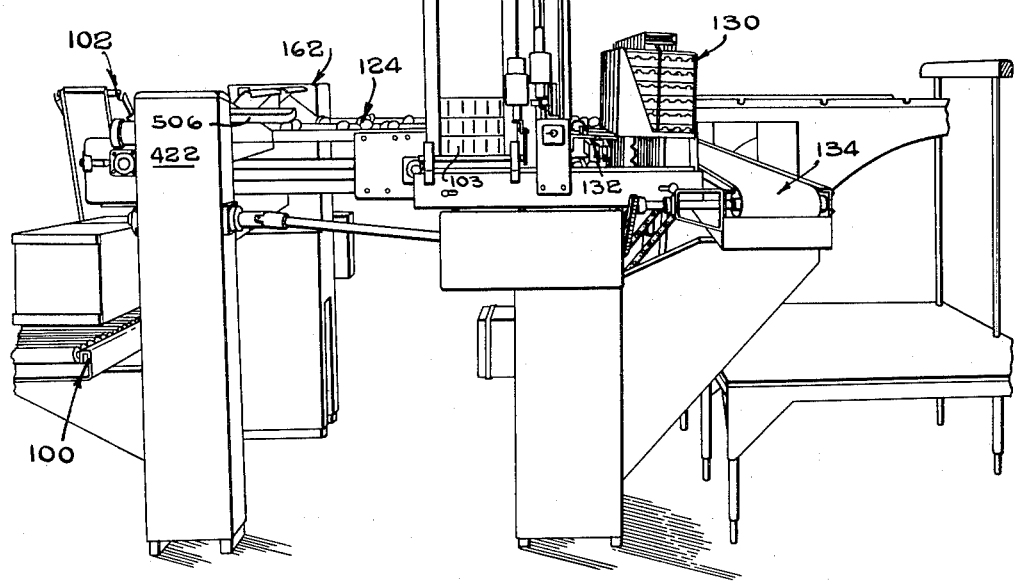

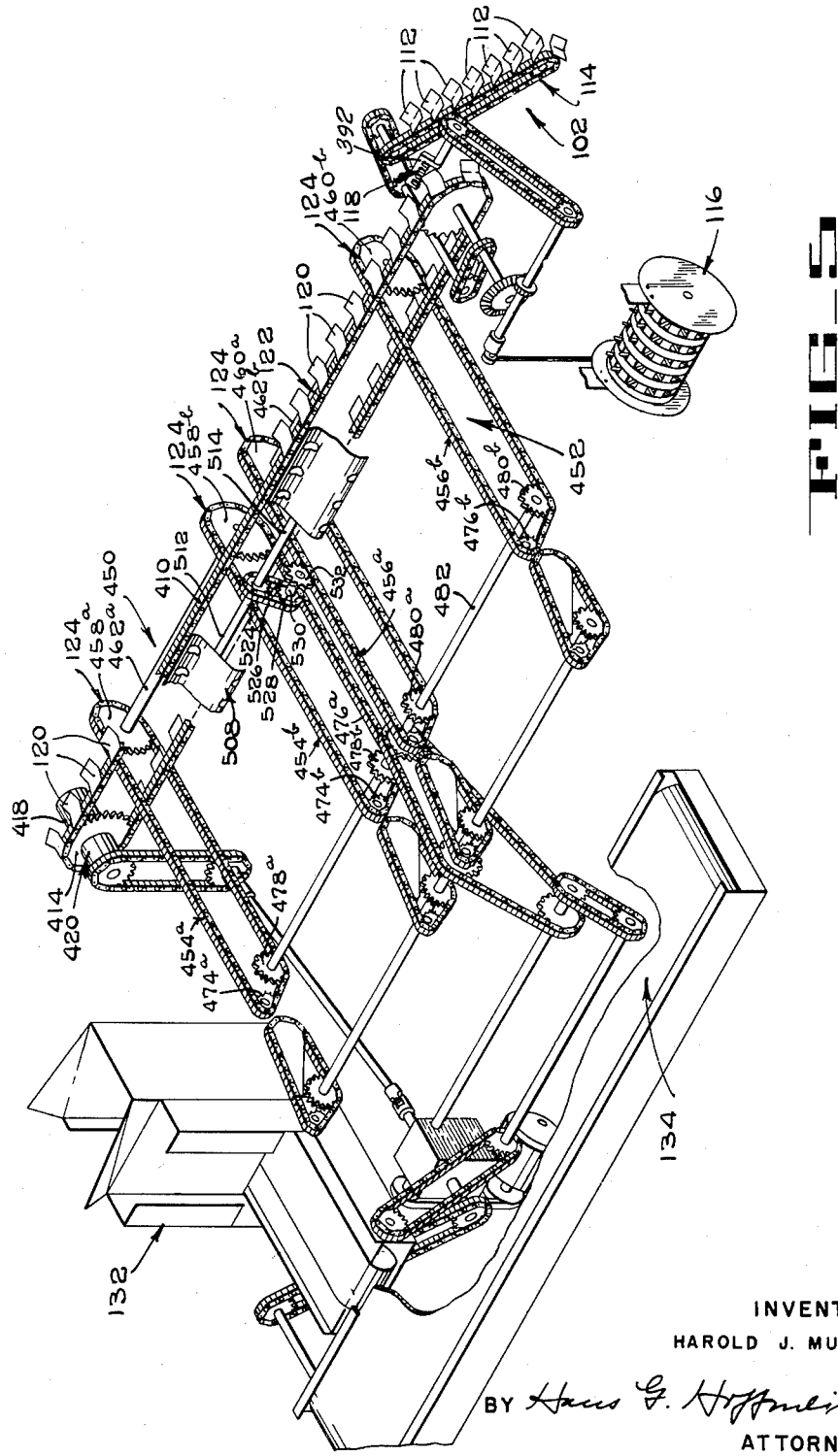

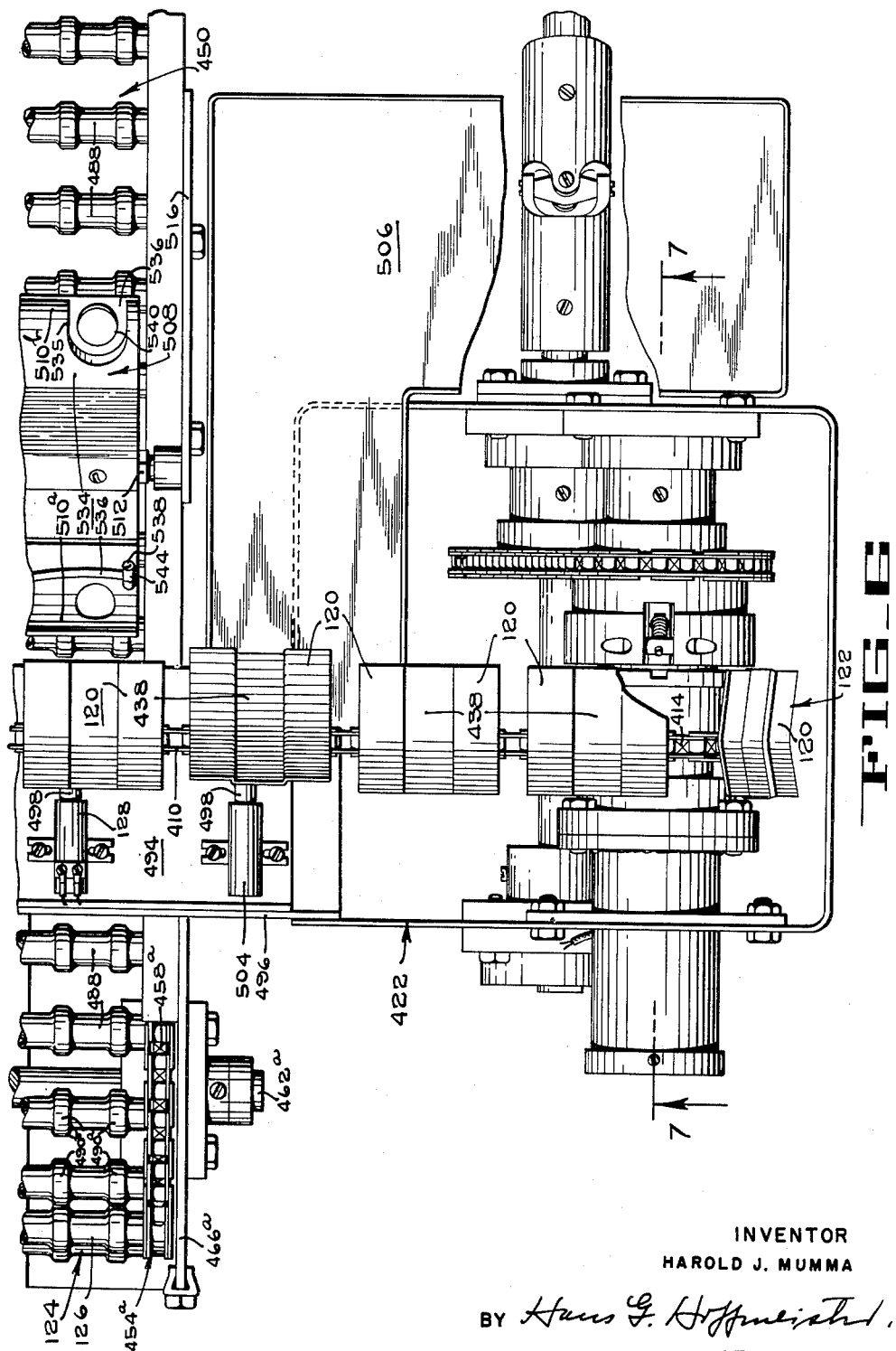

June 26, 1962 H. J. MUMMA 3,040,865
MACHINE FOR HANDLING EGGS
Original Filed June 1, 1953 13 Sheets-Sheet 10
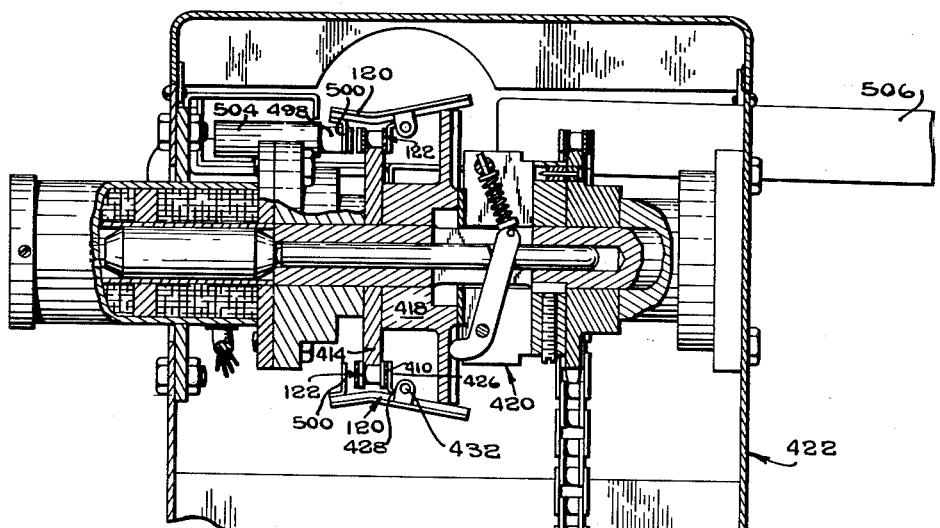
FIG_7
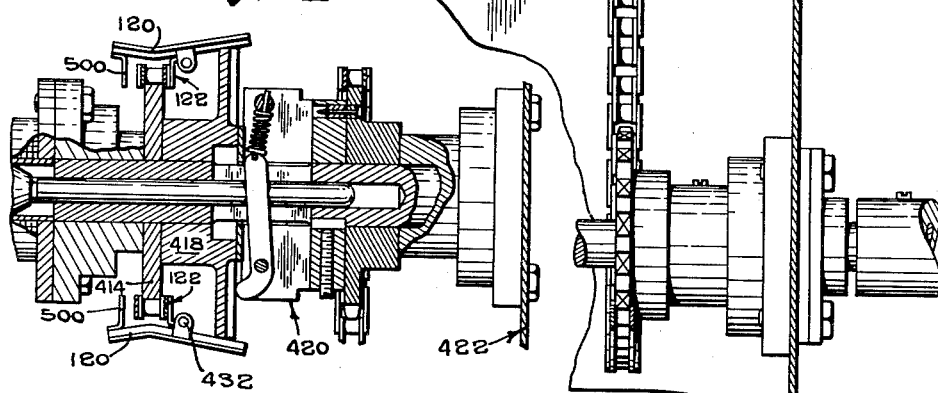
FIG_7A
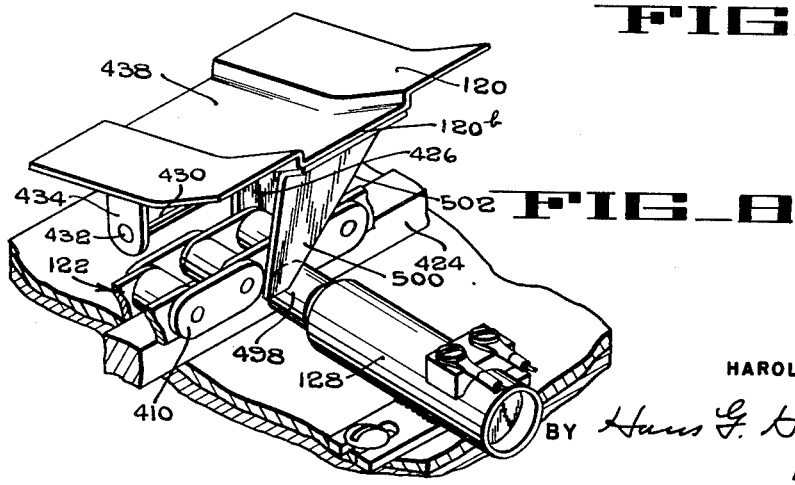
FIG_8
INVENTOR
HAROLD J. MUMMA
BY
ATTORNEY

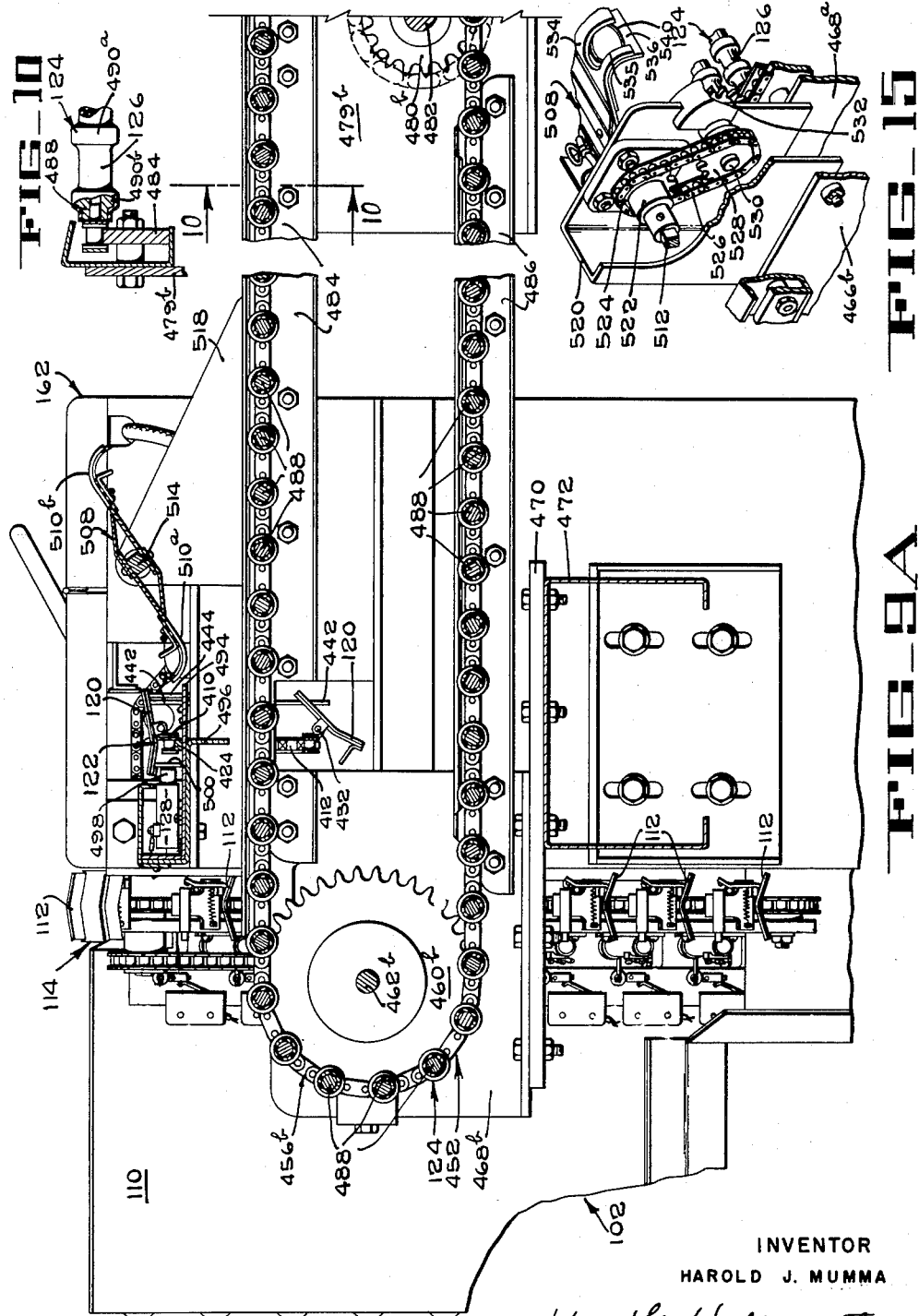

June 26, 1962
H. J. MUMMA
3,040,865
MACHINE FOR HANDLING EGGS
Original Filed June 1, 1953
13 Sheets-Sheet 12
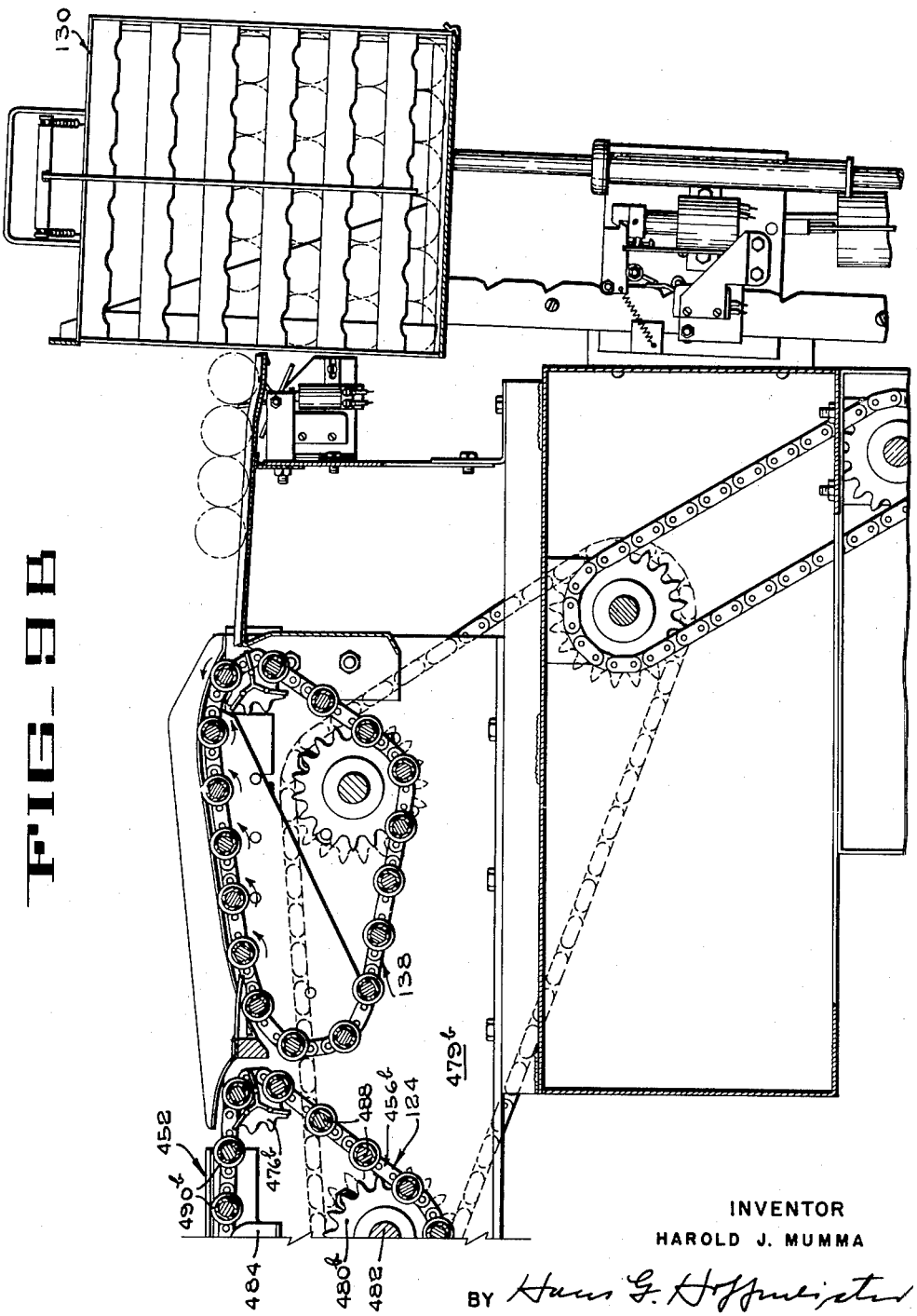
FIG_9B
INVENTOR
HAROLD J. MUMMA
BY *Hans G. Hoffmeister*
ATTORNEY June 26, 1962   H. J. MUMMA   3,040,865
MACHINE FOR HANDLING EGGS
Original Filed June 1, 1953   13 Sheets-Sheet 13
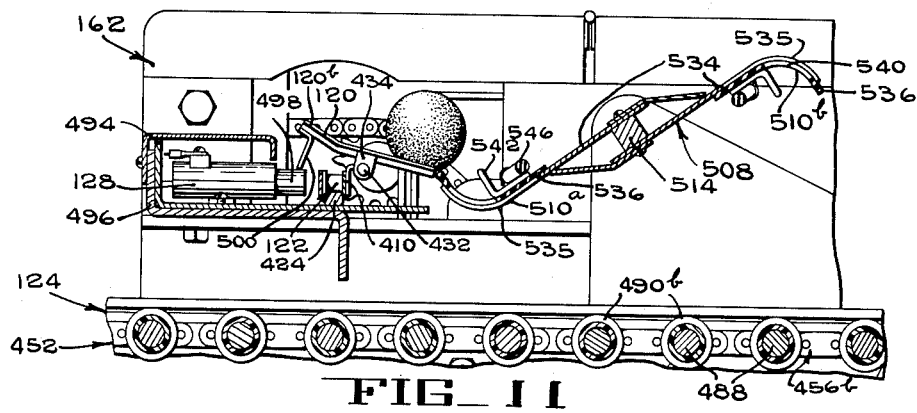
FIG_11
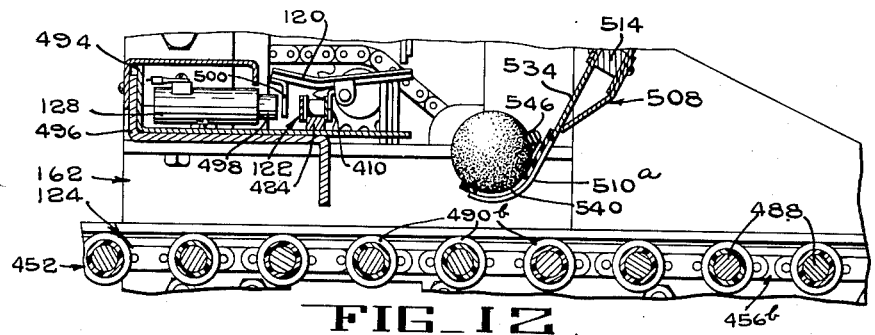
FIG_12
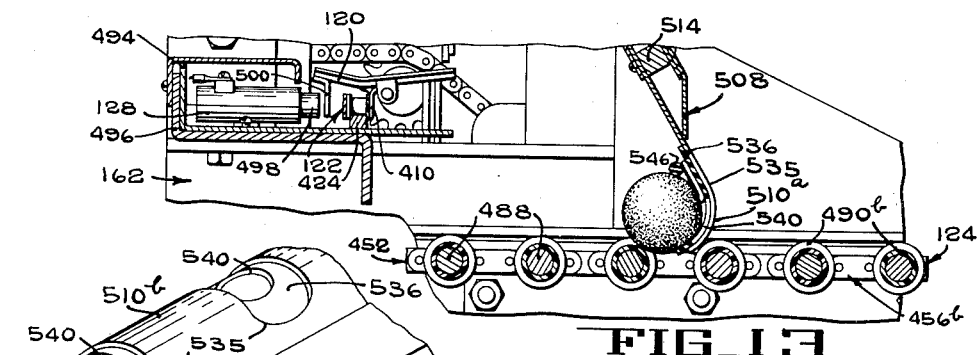
FIG_13
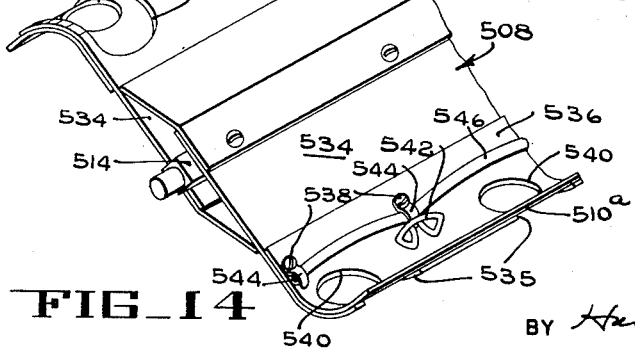
FIG_14
INVENTOR
HAROLD J. MUMMA
BY Hans G. Hoffmeister
ATTORNEY

United States Patent Office 3,040,865
Patented June 26, 1962

3,040,865
MACHINE FOR HANDLING EGGS
Harold J. Mumma, Riverside, Calif., assignor to FMC Corporation, a corporation of Delaware
Original application June 1, 1953, Ser. No. 358,621. Divided and this application Nov. 15, 1956, Ser. No. 622,428
7 Claims. (Cl. 198—25)

The present invention relates to machines and apparatus for handling eggs. More particularly, the present invention relates to machines and apparatus that assist in segregating the eggs received from the producers into desired classification groups according to quality and weight and which pack, or facilitate the packing of eggs of the same classification into cartons or cases for shipment to distributors and consumers.

This application is a division of my copending application, U.S. Serial No. 358,621, filed June 1, 1953, for a Machine for Handling Eggs.

An object of the present invention is to provide a mechanism for transferring objects from an upper conveyor to a lower conveyor extending transversely thereto.

Another object is to provide an arrangement wherein eggs may be transferred from a first conveyor to another conveyor extending below, and transversely to, said first conveyor while protecting the eggs from impacts that might damage them.

Another object is to provide a conveyor that will transport eggs with a minimum danger of breakage.

These and other objects and advantages of the present invention will become apparent from the following description of the accompanying drawings wherein:

FIG. 1 is a perspective of the total egg handling machine of the invention viewed from a point in front and to the right of the feed end thereof.

FIG. 2 is another perspective of the total egg handling machine viewed from a point in front and to the right of the egg discharge end thereof.

FIGS. 3A, 3B, 3C and 3D are the four quarters of a plan view of the total machine.

FIG. 4 is a perspective of the machine viewed from the side opposite to the feed end thereof.

FIG. 5 is a fragmentary schematic perspective illustrating the various power trains by means of which the movable components of the machine are driven from a common source of rotary power.

FIG. 6 is a fragmentary plan view of the machine taken at the end of the distributing conveyor with a top panel removed to expose structure underneath.

FIG. 7 is a fragmentary vertical section taken along line 7—7 of FIG. 6 and viewed in the direction of the arrows associated with said line.

FIG. 7A is a fragmentary vertical section similar to FIG. 7 illustrating a different operational position of the components shown therein.

FIG. 8 is a fragmentary perspective of the distributing conveyor showing one of the egg supporting cups mounted upon said conveyor.

FIGS. 9A and 9B are the left and right halves of a fragmentary vertical section through the total machine taken along lines 9—9 of FIGS. 3A and 3D and illustrating a multi-lane conveyor onto the different lanes of which the classified eggs are dropped from the before mentioned distributing conveyor according to their quality and weight and another multi-lane conveyor in tandem relation to said first-mentioned conveyor which carries the eggs through an oiling chamber (not shown) and delivers them finally to an egg accumulating mechanism that facilitates packing of said eggs into cartons, boxes and the like.

FIG. 10 is a section taken along line 10—10 of FIG. 9A and illustrating details in the construction of the first of the conveyors shown in FIGS. 9A and 9B, which will be termed the classification conveyor hereinafter.

FIG. 11 is an enlarged detail view of part of FIG. 9A illustrating mechanism for transferring an egg from one of the cups of the distributing conveyor to the classification conveyor.

FIGS. 12 and 13 are fragmentary sectional detail views similar to FIG. 11 illustrating said egg transfer mechanism in two consecutive operational positions.

FIG. 14 is a fragmentary perspective of said egg transfer mechanism.

FIG. 15 is a fragmentary perspective illustrating the manner in which said egg transfer mechanism is driven from the classification conveyor.

Construction and Operation of the Machine

The egg handling machine of the invention (FIGS. 1, 2 and 4) comprises a supply conveyor 100 which may have the form of a slightly inclined roller conveyor, whereupon cases or crates with eggs are delivered to the candling station 102. At the candling station, the operator takes the eggs from the cases or crates, checks them first for external appearance and places those that are deformed, excessively dirty or broken into the pockets of cardboard grids 103 on special trays 104 that are located at his right side. Those found to be of satisfactory external appearance, he views against a light beam emitted from a suitable electric torch 106 and places them according to their color and internal quality upon the proper racks or shelves 108 of a reclining grading board 110 that has eight such shelves or racks, 108a, 108b, 108c, 108d, 108e, 108f, 108g and 108h in superposed relation. From the racks or shelves 108 which are laterally inclined, the eggs slide onto the cups 112 of a single file elevator 114 while actuating electric mechanisms that register the quality of every egg according to the rack or shelf from which it is supplied to the conveyor on a rotary memory device 116 (FIG. 5), that moves in synchronism with the elevator 114 and which possess quality recording members corresponding to every one of the cups 112 that pass by, and may receive an egg from the racks or shelves of the grading board 110. The elevator 114 lifts the eggs successively to the level of, and delivers them into a weighing mechanism 118 which weighs each egg and registers its weight by electrical impulses on the memory device 116 with aid of weight recording members thereof that are aligned with the previously mentioned quality recording members. From the weighing mechanism 118 the eggs are transferred onto cups 120 (FIG. 3B) carried by the elongated horizontal run of a single file conveyor 122 which passes at right angles over another conveyor 124 that comprises as many parallel lanes 126 as there are different quality/weight classification groups provided for in the machine. The cups 120 on the horizontal run of the single file conveyor 122 advance in synchronism with both the feed elevator 114 and the memory device 116, hence, as an egg passes from the aforementioned feed elevator 114 onto the weighing mechanism 118 and from there onto a cup 120 of the single file conveyor 122, the cup 120 on the latter conveyor that receives the particular egg steps into the synchronous relation with the quality and weight recording members of the memory device 116 which, up to this point, was held by the elevator cup 112 that passed the egg to the weighing mechanism.

Above each classification lane 126 of the multi-lane conveyor 124 mechanism is provided in the form of solenoids 128 (FIGS. 3B and 3D) that are operable to tip the cups 120 of the single file conveyor 122 as they pass above said classification lanes so as to deliver the eggs from said cups into selected ones of said classification lanes. Energization of each of said solenoids 128 (FIGS. 3B and 3D) is arranged to require the simultaneous closure of at least two series-connected normally open switches whose position may be adjustable relative to the hereinbefore mentioned memory device and which may be closed depending upon their position, by selected ones of the hereinbefore mentioned quality and weight recording members of said device whenever a cup carrying an egg of the selected quality and weight combination passes over a particular preselected lane 126 of the classification conveyor 124. Thus, as the single file conveyor 122 carries the eggs over the various parallel lanes 126 of the classification conveyor 124, it distributes said eggs under control of the memory device into the proper classification lanes of said conveyor 124 so that each of said lanes will receive only eggs of predetermined quality and weight combinations.

The classification conveyor 124 may be arranged to feed the segregated eggs to egg accumulators 130 (FIG. 1) which are provided at the end of each classification lane and which operate to arrange the eggs in superposed tiers or rows. Alternatively, the classification lanes of transverse conveyor 124 may be arranged to feed the eggs into an automatic carton filling mechanism 132, and the automatically filled cartons are then delivered onto the upper run of a take-off conveyor 134 extending along the discharge end of the classification lanes 126 as best shown in FIG. 2.

*Distributing Conveyor, Classification Conveyor and Transfer Means*

The cups 120 into which a rotating transfer rod 392 sweeps the eggs from a platform 266 upon completion of the weighing operation are all mounted at equal intervals upon an endless chain 410 (FIG. 5). Said chain is trained about an idler sprocket 412 mounted upon a shaft 416 and a drive sprocket 414 mounted upon the driven side 418, respectively, of a clutch 420 that is located in a cabinet 422 at the rear side of the machine (FIGS. 1, 3B and 4). The shaft 416 is suitably journalled in the frame of the machine within a cabinet 162 that covers the hereinbefore described weighing mechanism 118 and the memory device 116. The upper horizontal run of the chain 410 is supported upon the rides along a ledge 424 (FIG. 9A) that extends between the cabinet 162 and the hereinbefore mentioned clutch cabinet 422. Links 426 of said chain on the side remote from the weighing mechanism are upwardly extended to form outwardly bent lugs 428 (FIG. 7) which carry firmly secured to their under side tubular bearings 430 (FIG. 8) extending in a direction longitudinally of the conveyor. Rotatably received within said bearings 430 are pivot studs 432, the protruding ends of which are firmly mounted in ears 434 that project downwardly from the under side of concave plates which form the egg supporting cups 120. Said plates are shaped in much the same manner as the plates that form the egg supporting cups 112 of the feed elevator 114 (described in detail in my aforementioned copending application) having a shallow but clearly defined transverse center depression 438 to permit an egg delivered laterally thereonto to roll to the lowest possible position within the cup and be properly supported at two longitudinally spaced points, no matter what its size may be. Means are provided to move the cups into, and positively maintain them in, the upright position wherein they are adapted to receive an egg from the weighing mechanism and support it properly as they move past, and are charged with eggs from, the weighing platform under the propelling force of the hereinbefore described transfer rod 392. For this purpose the hub of the sprocket 412 (FIG. 9A) carries on the side remote from the weighing mechanism a disc 442 of a somewhat larger diameter than the sprocket and as a cup 120 on the lower run of the conveyor 122 approaches, and swings around, said sprocket 412, the underside of its segment 120a is engaged by said disc 442 which forces the cup positively into the egg receiving position. After a cup has received an egg from the weighing platform, the weight of said egg maintains it in the clockwise position. Additional means may be provided, however, to hold the cups positively in said position as they transport eggs away from the weighing mechanism until they reach the classification conveyor where they may have to tilt in counterclockwise direction to discharge their load into selected lanes thereof. For this purpose, a guide bar 444 is suitably supported from the machine frame adjacent to and at about the same level as the crest of the guide disc 442 to assume the function of the latter once the cups have been removed from the effective range of said disc.

Disposed below and extending in a direction transversely to the distributing conveyor is the hereinbefore mentioned classification conveyor 124. In the embodiment of the invention illustrated in the accompanying drawings, said classification conveyor forms 18 parallel classification lanes and is actually formed by two parallel sections 450 and 452 of identical construction and performance (FIGS. 3B, 3D and 5). Each of said sections comprises a pair of transversely spaced endless sprocket chains, 454a, 454b and 456a, 456b, respectively. At the right side of the machine, as viewed from the front end thereof, said chains are trained about idler sprockets 458a, 458b and 460a and 460b, respectively, that are mounted upon a pair of axially aligned horizontally positioned shaft sections 462a and 462b. Said shaft sections are rotatably supported in horizontally positioned L-shaped angle irons 466a, 466b and 468a, 468b, respectively, which rest upon and are bolted to horizontal mounting plates 470 (FIGS. 1 and 9A). Said plates in turn rest upon, and are bolted to, a channel 472 that is supported from the confronting side walls of the cabinets 162 and 422. At the discharge end of the classification conveyor, its four sprocket chains are trained about upper idler sprockets 474a, 474b and 476a, 476b that are described in greater detail in my aforementioned copending application and which are rotatably supported from another set of L-shaped angle irons 477a, 477b and 479a, 479b that form part of the machine frame (FIGS. 3A, 3C, 9A and 9B). At said discharge end, the sprocket chains are also trained about drive sprockets 478a, 478b and 480a, 480b that are positioned below the idler sprockets and all of which are firmly mounted upon a common horizontal drive shaft 482 (FIG. 5) that extends through and is suitably journalled in the above mentioned L-shaped angle irons 477a, 477b and 479a, 479b. During performance of the machine, said drive shaft is continuously driven from a source of rotary power common to all the movable elements of the machine in a manner described in greater detail in my aforementioned copending application. Both the upper and lower runs of the classification conveyor chains 454a, 454b and 456a, 456b are supported on an ride along guide ledges 484 and 486, respectively (FIGS. 9A and 10), which are bolted to and extend between the hereinbefore described L-shaped angle irons at the feed and discharge ends of the conveyor.

Extending between, and pivotally supported from alternate links of the conveyor chains of each conveyor station, are tubular rods 488 provided at equal intervals along their length with pairs of collars 490a and 490b that are spaced apart from each other by a distance approximately equal to the width of the recesses or channels 438, provided in the egg supporting cups 120 of the distributing conveyor 122. The pockets 492 (FIGS. 3A and 3B) defined by the longitudinally aligned collar pairs of each two consecutive rods 488 are adapted to receive and support eggs delivered thereinto from the cups of the distributing conveyor with their main axes disposed parallel to the axes of said rods. The rods 488 may be made from metal but the pocket-forming collars are preferably made of an elastic material, such as rubber or nylon, to last mentioned conveyor are about to be aligned with the classification lanes of conveyor 124, one of the scoop-shaped side edges of the rotating transfer plates 534 has just dropped below the level of the inner side edge of a cup 120 in tilted position. Thus, if the ejection solenoid 128 above a certain classification lane has been energized and the projected armature thereof has caused a cup to tilt inwardly as shown in FIG. 11, an egg lying in said cup will slide and/or roll from said cup into the concave scoop-shaped portion of the transfer plate 534. There it comes against an area of rubber sheet that covers a recess 535 in, and is therefore unsupported by, the rigid metal plate 534 so that any impact of the egg with a metal surface even through a rubber sheet is almost entirely avoided. The apertures 540 in the rubber sheet 536 and the ability of said sheet to yield under the impact of the egg cooperate with the hereinbefore described rubber cord 546 to prevent that an egg deposited upon the scoops of the transfer mechanism may roll too far along the surface of the plates 534 and come into contact with the bare metal portions thereof. As an egg settles itself into one of the rubber lined recesses 535 of a transfer plate 534, said plate continues its rotary orbit and drops below the level of the cup 120. Then, as the transfer plate 534 continues its rotation, the scoop-shaped egg containing edge area thereof reaches its lowermost position directly ahead of one of the knuckled rods 488 of the classification conveyor. Hence, any eggs within said scoop-shaped edge area slip from the pockets formed by the rubber lined recesses 535 and are gently deposited into aligned ones of the pockets 492 formed by the pairs of collars 490a and 490b on said rod and the corresponding pairs of collars upon the directly succeeding rod of the classification conveyor. Thus, breakage of eggs during the transfer from the distributing conveyor onto the classification conveyor is held at a minimum.

While I have described my invention with the aid of a preferred embodiment, it will be understood that the constructional details described and shown in the accompanying drawings may be departed from without departing from the scope and spirit of my invention.

Also, while the machine of the invention as illustrated in the accompanying drawings and as described in the specification was specifically devised, and is employed for processing eggs, it will be understood that a machine embodying the principles of the invention may also be usefully employed to segregate other articles, such as avacados or other highly priced fruit.

I claim:

1. Mechanism for transferring articles from an upper conveyor to a lower conveyor extending at right angles to said upper conveyor comprising a plate, means for mounting said plate for rotation about an axis parallel to said upper conveyor with one of its end edges arranged to sweep past both said upper and said lower conveyors, means for rotating said plate in a direction moving said end edge thereof in a direction from said upper to said lower conveyor, said plate being bent along said end edge in a direction opposite to the direction of rotation of said plate to form an article retaining lip and said lip having a recess in its outer edge of a size sufficient to pass an article therethrough, and a sheet of yieldable material arranged to cover the concave side of said lip.

2. Mechanism for transferring eggs from an upper conveyor to a lower conveyor extending at right angles to said upper conveyor comprising a plate, means for mounting said plate for rotation about an axis parallel to said upper conveyor with one of its end edges arranged to sweep past both said upper and said lower conveyors, means for rotating said plate in a direction moving said end edge thereof in direction from said upper to said lower conveyor, said plate being bent along said end edge in a direction opposite to the direction of rotation of said plate to form an egg retaining lip and said lip having a recess in its outer edge of a size sufficient to pass an egg therethrough, and a sheet of yieldable material arranged to cover the concave side of said lip and having an aperture of a size insufficient to pass an egg therethrough in registry with the recess in said lip.

3. Mechanism for transferring eggs from an upper conveyor to a lower conveyor extending at right angles to said upper conveyor comprising a plate, means for mounting said plate for rotation about an axis parallel to said upper conveyor with one of its end edges arranged to sweep past both said upper and said lower conveyors, means for rotating said plate in timed relation with said upper conveyor with said end edge thereof moving in a direction from said upper to said lower conveyor, said plate being bent along said end edge in a direction opposite to its direction of rotation to form a scoop-shaped egg retaining lip, a plurality of recesses of a size sufficient to pass an egg therethrough provided in said edge, a sheet of yieldable material arranged to cover the concave side of said edge area and having apertures of a size insufficient to pass an egg therethrough in registry with the recesses in said plate, and deflector members provided above the concave side of said sheet intermediately of the apertures thereof.

4. A transfer mechanism for conveying an egg from one conveyor to another conveyor comprising a plate, said plate being arranged to form a pocket having a recess of sufficient size to pass an egg therethrough, a sheet of yieldable material supported by said plate and covering a portion thereof, said sheet of yieldable material having an aperture therein in registry with the recess of said pocket and of a size insufficient to pass an egg therethrough, and a resilient cord mounted on said plate and arranged thereon to limit the rolling movement of an egg to that portion of said plate having the yieldable sheet thereon.

5. A transfer mechanism for conveying an egg from one conveyor to another conveyor comprising a plate, said plate being arranged to form a pocket having a recess of sufficient size to pass an egg therethrough, a sheet of yieldable material supported by said plate, said sheet of yieldable material having an aperture therein in registry with the recess of said pocket and of a size insufficient to pass an egg therethrough, and a resilient deflector member secured to said plate and arranged to guide an egg received by said plate toward the aperture of said yieldable sheet.

6. In a transfer mechanism for handling eggs or the like, a conveyor member comprising a plate having two side-by-side pockets, and a resilient deflector mounted on said plate in fixed relation thereto between said pockets and rearwardly of a line extending between the centers of said pockets, said deflector having surfaces arranged to intercept an egg being moved rearwardly over said plate and to direct the egg to either one of said pockets.

7. A mechanism for transferring articles from an upper conveyor to a lower conveyor comprising a rotatable transfer conveyor extending at right angles to said upper conveyor with diametrically opposite end edges, means mounting said transfer conveyor for rotation about an axis intermediate said end edges, said axis extending transverse to said lower conveyor with said end edges arranged to alternately sweep from said upper conveyor toward said lower conveyor, means on said transfer conveyor defining an article receiving scoop adjacent each of said end edges, each of said scoops being arranged with its article supporting surface facing in a direction opposite to the direction of movement of the scoop, and means for rotating said transfer conveyor to advance each of said pockets at substantially the same linear speed as the speed of said lower conveyor from a position adjacent to and below said upper conveyor with the article supporting surface thereof facing generally upward to receive an article from said upper conveyor to a position adjacent said lower conveyor with the article supporting surface facing generally downward to deposit the article on said lower conveyor, whereby the articles transferred from said protect eggs deposited onto said collars from impact with hard surfaces. Additionally, the rods together with all the collars mounted thereon may be coated with an elastic plastic. This may be accomplished by pulling a distended tube of such a plastic over the rods and the collars and allowing said tube to contract to its normal condition in situ.

The rows of pockets 492 formed by longitudinally aligned pairs of collars 490a and 490b on the rods 488 form the classification lanes 126 into which eggs of the same quality and weight combination group are to be dropped from the distributing conveyor under control from the repeatedly mentioned memory device 116. As mentioned hereinbefore, whenever an egg of a particular quality and weight combination on the distributing conveyor 122 approaches a lane 126 on the classification conveyor that is intended to receive and gather all the eggs of said quality and weight combination, said memory device activates a solenoid 128 that tilts the cup which carries said egg on its pivot 432 (FIG. 8) in the direction away from the distributing conveyor chain causing the egg in said cup to drop onto the classification conveyor into the particular lane reserved for eggs of the same quality and weight combination.

Having reference to FIGS. 3B and 3D, a solenoid 128 is mounted for every one of the quality lanes 126 upon a common base plate 494 extending along the upper run of the distributing conveyor 122. Said base plate 494 may be of L-shaped cross section (FIG. 9A) and may rest upon a channel 496 that may be of S-shaped cross section and which extends between and is supported from the confronting walls of the repeatedly mentioned cabinets 162 and 422. The solenoids 128 are located exteriorly of the distributing conveyor with their axes disposed transversely to the plane defined by the chain thereof and each of said solenoids has a cylindrical armature 498. Upon energization of a solenoid 128 said cylindrical armature is projected into a position in close proximity with, but clear of, the upper run of the distributing conveyor chain 410 into the path of an approximately triangular lug or ear 500 (FIG. 8) depending from the outer section 120b of each of the egg supporting cups 120 of the distributing conveyor. Each of said lugs has a forwardly slanting leading edge 502, and hence, whenever a cup 120 approaches a solenoid 128 that has been energized, the forwardly slanting edge of said lug 500 engages the projected cylindrical armature of the solenoid and is therefore cammed upwardly as it rides over said armature. As a result thereof, the cup 120 is swung on its pivot 432 in counterclockwise direction as viewed in FIG. 8, causing any egg lying therein to slide or roll laterally from the cup into the proper lane of the classification conveyor underneath.

As will be noted from FIGS. 3B and 6, the base plate 494 carries, beyond the last of the classification lanes of the packing conveyor, a camming device 504 adapted to tilt any and all of the cups passing on the conveyor. Hence, eggs that might not previously have been discharged into one of the classification lanes, will be discharged into a suitable tray 506 supported from the clutch cabinet 422 and no such "forgotten" egg will drop onto the floor of the egg packing establishment as the cups swing around the drive sprocket 414 at the end of the distributing conveyor. In the particular embodiment of the invention illustrated in the accompanying drawings, said camming device 504 is formed by a solenoid of the same type as employed to selectively actuate the cups 120 during their travel about the classification conveyor. Said solenoid 504, however, is not connected in the electric control circuits comprised in the machine of the invention but has its armature permanently projected into cup-tilted position.

Since eggs are rather fragile, it is obviously not sufficient to merely tilt the cups of the distributing conveyor and let the eggs roll from said cups onto the classification conveyor underneath. In accordance with the invention, means are, therefore, provided that receive the eggs from the tilted cups of the distributing conveyor and deposit them gently into the proper pockets of the packing conveyor at a speed equal to the rate of travel of said packing conveyor. In the particular embodiment of the invention illustrated in the accompanying drawings, said transfer mechanism is formed by a continuously operating axially elongated rotor 508 that is disposed longitudinally of, and adjacent to, the discharge of the diametrically opposite scooping surfaces 510a and 510b that turn in timed relation with the distributing conveyor and the classification conveyor in a direction opposite to what may be considered a normal scooping operation in that they receive eggs from the tilted cups of the distributing conveyor and lower them backwardly to the level of the classification conveyor. Having reference to FIGS. 5, 9A, 11, 12 and 13, said rotor 508 comprises two shaft sections 512 and 514 of preferably square cross section corresponding to the two sections 450 and 452 of the classification conveyor. At both their ends, said shaft sections form cylindrical tenons. Their outer tenons are suitably journalled in vertically positioned triangular vanes 516 and 518, respectively, that are supported from the side flanges of the hereinbefore mentioned outer angle irons 466a and 468b. The inner tenons of said shaft sections are journalled in the side flanges of an upright 520 of U-shaped cross section that may be supported from the inner angle irons 466b and 468a (FIG. 15). Said inner tenons are both bolted to the hub 522 of a common drive sprocket 524 for rotation in unison, and a sprocket chain 526 connects said drive sprocket operatively to another sprocket 528 mounted upon one end of a stub shaft 530 that protrudes through, and is rotatably supported in, one of the flanges of the hereinbefore mentioned upright 520. Upon its other end said stub shaft 530 carries another sprocket 532 (FIG. 5) that meshes with the inner sprocket chain 456a of the classification conveyor section 452 causing both the shaft sections of the transfer rotor to turn in predetermined synchronism with the classification conveyor.

Bolted to opposite faces of each of the square-shaped shaft sections 512 and 514 are elongated plates 534 extending over the total transverse width of their respective classification conveyor sections. The free edges of said plate are smoothly bent in opposite directions in the manner of scoops and contain a plurality of recesses 535 of a size larger than the maximum sized egg, one in alignment with each of the lanes formed by the classification conveyor sections (FIG. 14). The concave surfaces of the scoop-shaped end portions of the plates 534 are lined with rubber sheets 536 that may be suitably secured to said plates, such as by means of screw bolts 538. Said rubber sheets are preferably arranged to extend beyond and hang over the outer edges of the plates 534, and in registry with the recesses 535 in said plates they are provided with preferably circular apertures 540 of a size that is insufficient to pass the smallest egg to be handled by the machine. Disposed intermediately of each two adjacent recesses 535 and apertures 540, respectively, at points approximately in line with the rear edges of said apertures 540 are wire loops 542 that are preferably coated with a resilient plastic and which may be held in place by clamps 544 that are secured to the plates 534 by the same screw bolts 538 that held the rubber sheets 536 in place. Said wire loops 542 serve to deflect eggs delivered from the tilted cups of the distributing conveyor onto the transfer mechanism into their proper lanes, and a longitudinally extending rubber cord 546, held in position by the same clamps 544, acts as a stop means to prevent eggs delivered onto the rubber lined scoop-shaped edge portions of the plates 534 from rolling onto the bare metal portions thereof where they might come to harm.

During practical performance, the described transfer mechanism turns continuously in counterclockwise direction as viewed in FIGS. 9A, 11, 12 and 13, and its rotation is timed in such a manner with the operation of the distributing conveyor that whenever the cups 120 on said upper conveyor to said lower conveyor are moved in the direction of movement of said lower conveyor and at substantially the same speed.

References Cited in the file of this patent

UNITED STATES PATENTS

| | | |
|---|---|---|
| 381,419 | Reis | Apr. 17, 1888 |
| 386,696 | Elwell | July 24, 1888 |
| 849,122 | George | Apr. 2, 1907 |
| 1,062,379 | Anderson et al. | May 20, 1913 |
| 1,156,219 | Eggleston | Oct. 12, 1915 |
| 1,756,553 | Hippenmeyer | Apr. 29, 1930 |
| 1,938,947 | Whitmore | Dec. 12, 1933 |
| 1,964,152 | Hansen | June 26, 1934 |
| 1,964,508 | Diescher | June 26, 1934 |
| 2,124,464 | Foote | July 19, 1938 |
| 2,629,479 | Sneed et al. | Feb. 24, 1953 |
| 2,755,913 | Marasso | July 24, 1956 |
| 2,760,536 | Willsey | Aug. 28, 1956 |